United States Patent [19]
Hobden et al.

[11] Patent Number: 5,619,248
[45] Date of Patent: Apr. 8, 1997

[54] VIDEO SIGNAL DISTRIBUTION SYSTEM MICROWAVE RADIO LINK FOR TRANSMITTING DOUBLE SIDEBAND PHASE MODULATED CARRIER SIGNAL

[75] Inventors: Mervyn K. Hobden; David G. Spencer, both of Lincoln; John G. L. Rhodes, deceased, late of Cornwall; Ronald Turner, executor, Wiltshire, all of United Kingdom

[73] Assignees: Plessey Semiconductors Limited; MCEL p.l.c., both of United Kingdom

[21] Appl. No.: 261,401

[22] Filed: Jun. 17, 1994

[30] Foreign Application Priority Data

Jul. 6, 1993 [GB] United Kingdom ............... 9313969
Mar. 29, 1994 [GB] United Kingdom ............... 9406185

[51] Int. Cl.$^6$ .................................................. H04N 7/10
[52] U.S. Cl. ................................. 348/6; 455/3.1; 455/46
[58] Field of Search ........................ 348/6, 724; 455/3.1, 455/6.1, 46, 110; H04N 2/10

[56] References Cited

U.S. PATENT DOCUMENTS

| | | | |
|---|---|---|---|
| 3,778,718 | 12/1973 | Bass et al. ........................... | 348/724 |
| 4,410,911 | 12/1983 | Field et al. .......................... | 348/3 |
| 4,475,242 | 10/1984 | Rafal et al. ......................... | 455/3.1 |
| 5,065,340 | 11/1991 | Boria et al. . | |
| 5,077,542 | 12/1991 | Lanoiselee ......................... | 455/46 |
| 5,148,279 | 9/1992 | Gabor . | |
| 5,214,390 | 5/1994 | Montreuil . | |
| 5,317,288 | 5/1994 | Yung et al. ........................ | 455/110 |

FOREIGN PATENT DOCUMENTS

| | | |
|---|---|---|
| 55-083306 | 6/1980 | Japan . |
| 62-294346 | 12/1987 | Japan . |
| 01303986 | 12/1989 | Japan . |
| WO84/02044 | 5/1984 | WIPO . |

Primary Examiner—Victor R. Kostak
Attorney, Agent, or Firm—Kirschstein et al.

[57] ABSTRACT

In a video signal distribution system in which a plurality of video signals are modulated onto individual carrier signals spaced over a band of frequencies to form a composite signal for transmission over cables of the system, a point-to-point radio link forming part of the distribution system is provided in which the composite signal is transmitted as double side band phase modulation of a single microwave carrier signal.

5 Claims, 2 Drawing Sheets

VIDEO SIGNAL DISTRIBUTION SYSTEM MICROWAVE RADIO LINK FOR TRANSMITTING DOUBLE SIDEBAND PHASE MODULATED CARRIER SIGNAL

BACKGROUND OF THE INVENTION

1. Field of the Invention

The present invention relates to video signal distribution systems, and in particular to such systems including point-to-point radio links.

2. Summary of the Invention

According to the invention in a video signal distribution system in which a plurality of video signals are arranged to be modulated on respective subcarriers of respective different frequencies spaced over a band of frequencies to form a wide-band composite signal for transmission along cables of the system, there is provided a microwave point-to-point radio link over which said composite signal is arranged to be transmitted as double side-band phase modulation of a single microwave carrier signal.

BRIEF DESCRIPTION OF THE DRAWINGS

A microwave point-to-point radio link for a video signal distribution system, in accordance with the present invention, will now be described with reference to the accompanying drawings, of which.

DETAILED DESCRIPTION OF THE PREFERRED EMBODIMENTS

Figure 1:
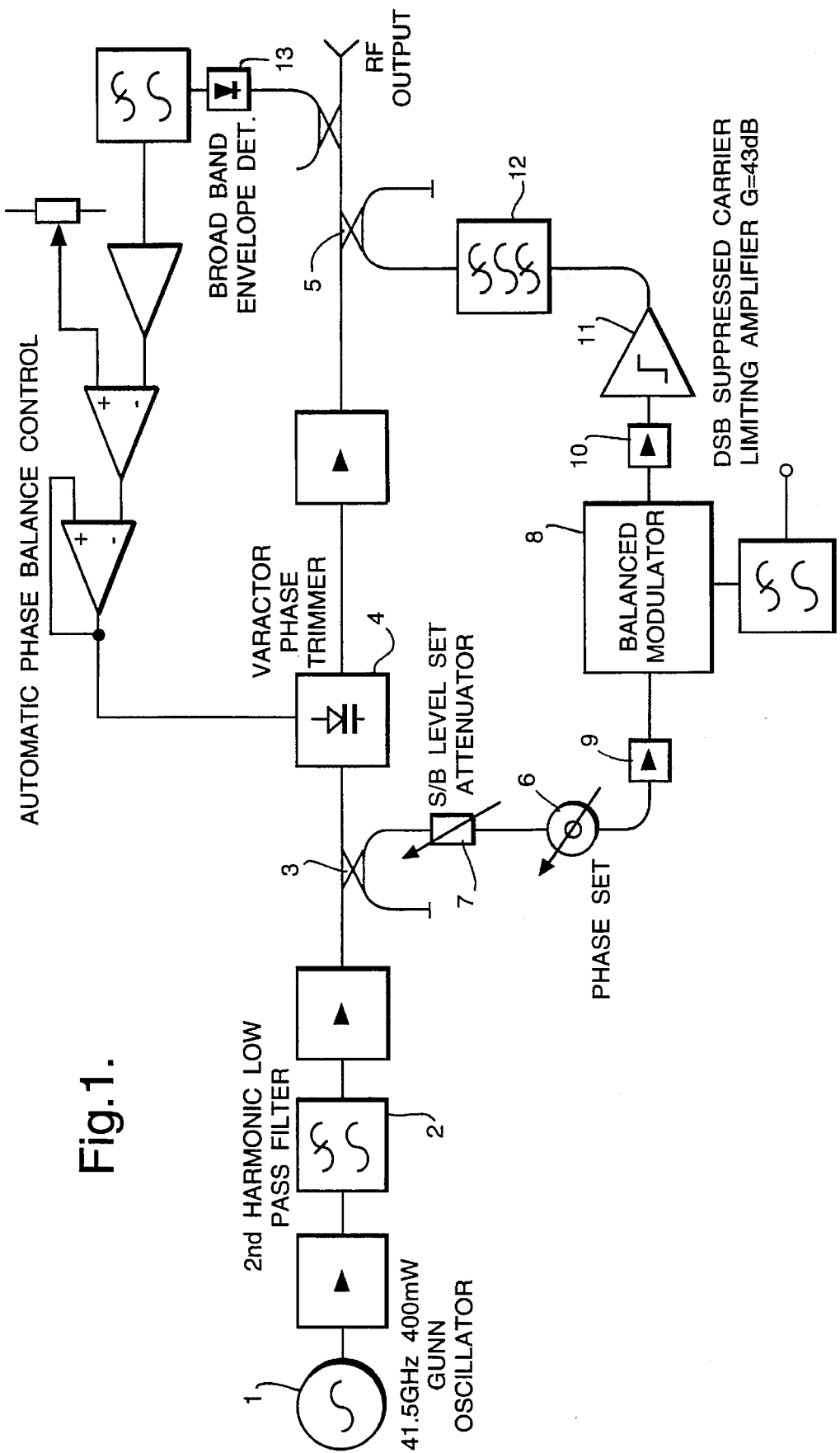
FIG. 1 shows a transmitter arrangement schematically.

Referring first to FIG. 1, the first part of the transmitter arrangement consists of a source 1 of millimeter wave power sufficient to drive the modulator/upconverter. This may be a stabilised GUNN oscillator, synthesised source or any convenient method known to the art with stability and spectral purity adequate for the application. The output of the source 1 is taken via a low pass filter 2 to limit the level of even order harmonics of the source frequency.

The signal is split into two paths by means of a −3 dB, 180° hybrid coupler 3. The carrier reference path is fed via a phase trimmer 4 to the input port of a second reversed −3 dB, 180° coupler 5. The modulation path takes the output from the second port of the first coupler 3 and feeds this signal via a phase shifter 6 and a level set attenuator 7 to a balanced modulator 8. The modulator match is isolated from the modulation path by means of microwave isolators 9 and 10 on its input and output ports respectively. The modulation port of the modulator 8 is fed with the desired amplitude modulated intelligence at the same frequency and channel spacing as that of the cable video signal. The action of the modulator is to impose amplitude modulation of the microwave carrier at the modulation rates of the complete band of cable video signals. To provide high linearity of modulation across the working bandwidth both the amplitude and phase of the superposed modulation may be adjusted by means of the level set attenuator 7 and the phase shifter 6 in the modulation path. By this means the superposed modulation may be adjusted so as to exactly represent pure amplitude modulation across the working bandwidth of the modulator. Furthermore, if the input signal to the modulator 8 be predistorted in both amplitude and phase so as to compensate for the inherent residual non-linearity of the transmitting amplifier chain, then the modulator controls may be used to optimise the overall performance of the said chain by means of the inherent capability of the said modulator to provide any combination of modulation between pure phase modulation and pure amplitude modulation.

In order to generate pure DSB phase modulation the modulation dement itself must be so balanced as to produce amplitude modulated double sidebands with the carrier component suppressed by a minimum of −50 dB of the source input power to the modulator input port. This is to ensure that the carrier leakage power at the reinsertion point 5 is below the level at which the vectoral recombination of the leakage component of the carrier with the desired reinsertion component would produce envelope modulation of the combined signal due to the phase differences between the two paths. Also, the delay through the two paths must be equalised by means of additional broadband delay in the carrier phasing path. The purpose of the above two actions is to ensure that the optimum phase relationship can be achieved between the lower sideband, the carrier and the upper sideband.

The directivity of the couplers 3 and 5 used to construct the modulator, together with microwave isolators 9 and 10 must be sufficient to ensure that reverse isolation through both the direct and coupled paths, exceeds the required dynamic range of the complete modulator. As the output of the modulator into the coupled path now consists of a DSB amplitude modulated suppressed carrier signal, an amplifier 11 can be used, post the modulator and before the coupler 5 recombining the sidebands with the carrier. The specification for the linearity of this amplifier 11 is not critical to the operational linearity of the recombined output signal. The 2nd and 3rd order components will be dealt with as will be explained. The essentially narrowband nature of the signal at the microwave frequency ensures that the majority of cross products fall out of band, reducing the occurrence of triple beat products to an acceptable level in the modulator output.

It is therefore possible to use the modulator with a source of sufficient power as a stand-alone microwave transmitter, directly feeding its output to an antenna.

Given that the above conditions are satisfied, the modulator can be adjusted so as to transform the amplitude modulation on the coupled path into DSB phase modulation at the output port, with the modulation and all its components exactly representing those expected from phase modulation as expressed below; namely:

1) A component, at the fundamental modulation frequency or frequencies, proportional to the desired modulation index that represents pure DSB modulation in phase with respect to the carrier term.

2) A component at the second harmonic of the modulation frequency whose magnitude, proportional to the desired modulation index, represents pure DSB amplitude modulation with respect to the carrier term.

3) A third component, at the third harmonic of the modulation frequency, also representing pure phase modulation with respect to the carrier.

4) Further components, alternatively representing amplitude and phase modulation with respect to the carrier, of defined magnitude, where odd order sidebands are phase modulated and even order sidebands are amplitude modulation; such components are noted but are of no importance to the operation of the system.

The output of the modulator containing these components may be passed through a radio frequency amplitude limiter or the amplifier 11 may be a limiting amplifier, to remove the amplitude modulation at the 2nd and higher even order harmonics at the modulation frequency or frequencies.

The output of the amplifier 11 may be passed through a band-defining filter 12 such that all components, from the 3rd harmonic of the lowest desired modulation frequency upwards, are eliminated.

The outputs of two or more modulators, each of which meets all of the above requirements, may be combined to give a wide-band output composed only of phase modulation with respect to the carrier term. This may then be amplified by means of any suitable microwave amplifying means of sufficient bandwidth to avoid PM to AM conversion to the desired power level for transmission. The minimum number of modulators required to carry the full cable RF video band width of 55–550 MHz is two. Based on the performance of the existing modulator, the maximum required, to carry two banks of 25 channels each, would be three.

Using the above method, it is noted that, as only the quadrature component of the modulation contains the required intelligence, added envelope noise in the transmission system, or the receiver, can be eliminated by means of an amplitude limiter in the receiver intermediate frequency amplifier. Further, the inherent amplitude noise of the product detector and the quadrature locked oscillator used to demodulate the phase modulated carrier to recover the signal intelligence, is also rejected by the known performance of such a product detector.

The carrier component in the transmitted signal is used to lock the demodulating oscillator to the transmitted carrier, thereby ensuring that the signal to noise degradation of the system is gradual, rather than catastrophic.

The use of the above phase modulation system, with its rejection of the inherent amplitude modulation produced at the desired modulation index, maximises the number of channels that can be upconverted via a single modulator with linearity sufficient to avoid the production of intermodulation products which would degrade the final system dynamic range.

As only phase modulation is seen by all amplifying elements within the system, the production of intermodulation products due to amplitude non-linearities within these elements is minimised.

Any residual amplitude modulation of the output signals of the modulator may be detected by a broad band detector 13 and fed back to the phase trimmer varactor 4 to adjust the phase of the reinserted carrier component.

A single product detector may be used in the receiver to demodulate all the channels with high linearity due to the small percentage bandwidth of the signal at the intermediate frequency and the high degree of quadrature maintained by the locking of the demodulation oscillator to the carrier term in the I.F. signal.

Figure 2:
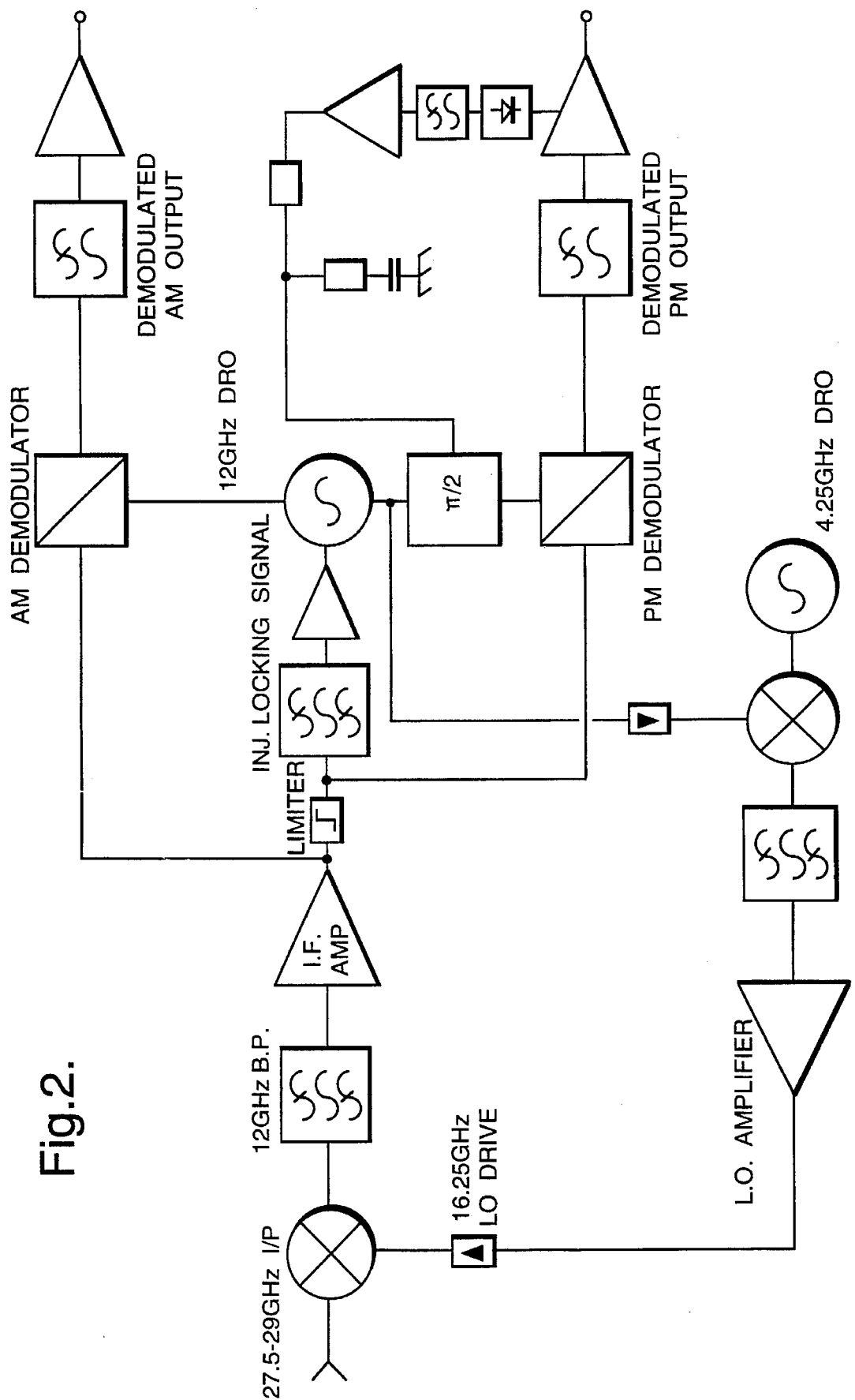
FIG. 2 shows a receiver arrangement.

The receiver configuration is shown in FIG. 2. An I.F. limiter or limiting amplifier is used to separate the AM and PM functions of the receiver.

With the system of modulator and receiver as described, operated at a phase modulating index for a 40 channel system such as to place the level of the individual channel sidebands not lower than −10 dB with respect to the carrier power, an improvement in signal to noise of not less than 9 dB will be seen over a system using DSB AM at the same sideband/carrier ratio.

Further gains in signal to noise may be achieved by the use of higher sideband levels giving a higher phase modulation index. However, this could lead to the rapid degradation in picture threshold quality at the range limit.

If synchronisation of the I.F. locking oscillator is degraded, the threshold performance is identical to that of a common FM system; for relatively small changes in S/N, large picture disturbances of the type known as 'sparklies' occur.

The advantage of the DSB phase modulated system is that the picture threshold quality degrades in exactly the same manner as that of an DSB AM system, providing that the carrier locking system threshold is maintained below that of the frame and colour synchronisation threshold of the demodulators in the television receiver for the sideband intelligence.

As the carrier synchronisation bandwidth is significantly less than that of the video demodulation bandwidth, carrier levels lower than the sidebands can be supported, providing that due account is taken of the maximum phase modulation index used; which must be such that amplitude disturbance of the carrier term, found from classical phase modulation theory, is below the AM to PM conversion threshold of the synchronised oscillator in the receiver.

A receiver designed so as to meet the above criteria is then the optimum for the demodulation of the proposed phase modulation system, it being understood that all other parts of the receiver represent the best available techniques from the state of the art for the required overall performance.

Other features of the microwave point-to-point link described above are described and claimed in co-pending patent application Ser. No. 9313969.9.

We claim:

1. A video signal distribution system for transmitting a wide-band composite signal having a plurality of video signals modulated on respective sub-carriers of respective different frequencies spaced over a band of frequencies, said distribution system comprising: a microwave point-to-point radio link having a transmitter arrangement including means for amplitude modulating said composite signal onto a microwave carrier frequency signal having a relative phase and amplitude to provide a double-sideband suppressed carrier amplitude modulated signal, means for combining said modulated signal with a carrier frequency reference signal, and means for adjusting the relative phase and amplitude of said microwave career frequency signal and said reference signal to provide a double side-band phase modulated carrier signal for transmission over said microwave radio link.

2. The video signal distribution system in accordance with claim 1 wherein said reference signal is in phase quadrature with said microwave carrier frequency signal.

3. The video signal distribution system in accordance with claim 1 wherein said double side-band phase modulated carrier signal has an amplitude, and wherein said means for adjusting the relative phase and amplitude of said microwave carrier frequency signal and said reference signal is responsive to the amplitude of said double side-band phase modulated carrier signal.

4. A wide-band microwave modulator arrangement for a video signal distribution system, comprising: a microwave carrier signal source, means for directing signals from said source over a first path including phase shift means and a balanced amplitude modulator arrangement and over a second path including phase adjusting means, means for applying video signals to a modulating input of said modulator arrangement, means for combining signals from outputs of said first and second paths to provide substantially phase modulated output signals, and means responsive to the amplitude of said phase modulated output signals for providing a phase adjusting signal to said phase adjusting means in said second path.

5. A wide-band microwave modulator arrangement for a video signal distribution system, comprising: a microwave carrier signal source, means for directing signals from said source over a first path including phase shift means and a balanced amplitude modulator arrangement and over a second path including phase adjusting means, and means for combining signals from the outputs of said first and second paths to provide substantially purely phase modulated output signals.

* * * * *